United States Patent [19]

Shimizu et al.

[11] Patent Number: 4,849,564
[45] Date of Patent: Jul. 18, 1989

[54] FINELY DIVIDED SILICONE RUBBER ADDITIVE MATERIAL AND METHOD FOR PRODUCING SAME

[75] Inventors: Koji Shimizu; Mitsuo Hamada; Katsuyoshi Nakasuji, all of Chiba, Japan

[73] Assignee: Toray Silicone Co., Ltd., Tokyo, Japan

[21] Appl. No.: 236,707

[22] Filed: Aug. 25, 1988

[30] Foreign Application Priority Data

Aug. 27, 1987 [JP] Japan ................................. 62-213877

[51] Int. Cl.$^4$ ............................................... C08K 5/15
[52] U.S. Cl. ..................................... 524/114; 524/317; 524/366; 525/476; 528/15; 528/31; 528/32; 528/17; 528/34
[58] Field of Search ..................... 524/114, 317, 366; 525/476; 528/15, 31, 32, 17, 34

[56] References Cited

U.S. PATENT DOCUMENTS 3,842,141 10/1974 Fetscher et al. ..................... 525/476
4,330,456  5/1982 Bonnaud .............................. 524/114
4,673,718  6/1987 Ryntz et al. ......................... 525/476

FOREIGN PATENT DOCUMENTS 2129820  5/1984 United Kingdom .

*Primary Examiner*—Melvyn I. Marquis
*Attorney, Agent, or Firm*—Robert Spector

[57] ABSTRACT

The finely divided cured silicone rubber particles of the present invention contain at least epoxide compound or a condensation product thereof. The epoxide compound or a condensation product thereof can be present in the free state or chemically bonded to the silicone rubber, and the particles have a particle diameter of 1 mm or less. The particles exhibit excellent compatibility with a variety of materials, including various organic resins and synthetic rubbers, and when added to or admixed with these materials enhance the physical properties of these materials and are durably bonded within matrices of these materials.

6 Claims, No Drawings

FINELY DIVIDED SILICONE RUBBER ADDITIVE MATERIAL AND METHOD FOR PRODUCING SAME

BACKGROUND OF THE INVENTION

1. Field of the Invention

The present invention concerns a finely divided silicone rubber additive material and a method for manufacturing this material. In particular, this invention concerns a finely divided cured silicone rubber which is particularly suited for use as a reinforcing agent for a variety of materials, including elastomers and resins.

2. Description of the Prior Art

In recent years, finely divided silicone rubber particles have been used as additives for organic resins to impart or improve properties such as, for example, water resistance, shock tolerance, strength, and as internal stress-relaxation agents for hard and brittle organic resins.

Finely divided silicone rubber particles and methods of manufacture these materials are known in the art. These methods include, for example, spraying a liquid silicone rubber composition into a high-temperature gas where the composition hardened in spray form to yield a silicone rubber particulate having spherical particles with excellent lubricating properties. This method is disclosed in Japanese Patent Publication 59/68,333.

Japanese patent publication No. 61/101,519 teaches heat treating a mixture of a high molecular weight, powdered dimethylsiloxane and a silane substituted with an epoxy group for the purpose of preparing a dimethylpolysiloxane powder having a surface covered with the silane. This powder is not a rubber and therefore does not exhibit the typical properties of a rubber in that it is readily deformed when subjected to external stresses and is readily soluble in various solvents. These properties make handling of the material difficult. Because the material lacks rubbery elasticity it is not very effective in absorbing impact energy and relaxing stress. These properties limit applications for the material, and makes it less than entirely satisfactory.

The present inventors conducted a number of investigations aimed at resolving the foregoing problems of compatibility and adhesion. These investigations resulted in the products and method described in this specification.

One objective of this invention is to provide a novel type of finely divided silicone rubber which is particularly suitable for use as a reinforcing agent for various organic resins and rubbers. A second objective is to provide a method for manufacturing this finely divided silicone rubber particulate.

SUMMARY OF THE INVENTION

The objectives of this invention are achieved by a novel finely divided cured silicone rubber particles containing an epoxy compound having at least one unsaturated hydrocarbon group in each molecule. The epoxy compound can be present in the form of the free compound or can be chemically bonded to the cured silicone rubber.

DETAILED DESCRIPTION OF THE INVENTION

The present invention relates to a finely divided additive material having a maximum particle diameter of up to 1 mm and comprising a cured silicone rubber and from 0.1 to 15 percent, based on the weight of said material, of an epoxy compound containing at least one unsaturated hydrocarbon group per molecule or a condensation product of said compound, where said compound is present is the unreacted form or is chemically bonded to said silicone rubber.

This invention also relates to an improved method for preparing finely divided cured silicone rubber particles, the method comprising the sequential steps of I. dispersing as the discontinuous phase in water a curable liquid silicon rubber composition comprising
   (A) a diorganopolysiloxane having at least 2 silicon-bonded hydroxyl groups per molecule,
   (B) an organohydrogenpolysiloxane having at least 2 silicon-bonded hydrogen atoms per molecule, and
   (C) a curing catalyst, II. bringing said dispersion into contact with a gas or liquid having a temperature higher than that said water to cure said composition in the form of said finely divided additive having a particle diameter of one mm or less, where the improvement comprises the presence in said liquid silicone rubber composition of
   (D) an epoxide compound containing at least one unsaturated hydrocarbon group per molecule or a condensation product thereof, where said epoxide compound or condensation product is present in either an unreacted form or is chemically bonded within said particle.

In accordance with another embodiment of the method present method, the diorganopolysiloxane identified hereinbefore as (A) and referred to hereinafter as ingredient A1 contains two silicon-bonded alkenyl groups in each molecule in place of the two hydroxyl groups of ingredient A and is reacted with the organohydrogenpolysiloxane referred to hereinbefore as ingredient B in the presence of a platinum-containing catalyst, referred to hereinafter as ingredient C1.

The characterizing feature of the finely divided cured silicone rubber additive of this invention that distinguishes it from the aforementioned prior art is the presence of an epoxy compound containing at least one unsaturated hydrocarbon group per molecule or a condensation product obtained by polymerizing the epoxide compound using known methods.

Specific examples of epoxide compounds suitable for use in the finely divided silicone rubber particles of this invention include but are not limited to glycidyl methacrylate, glycidyl acrylate, allyl glycidyl ether, and vinlycyclohexene monoxide.

The epoxide compound can be present as an unreacted or partially condensed ingredient in the cured silicone rubber powder of this invention or it can be chemically bonded to the silicone rubber.

Bonding of the epoxide compound to the silicone rubber particles can occur, for example, by the reaction of the unsaturated hydrocarbon group of the epoxide compound with unsaturated hydrocarbon groups present in the organopolysiloxane used to prepare the silicone rubber particles or by reaction between epoxy and/or hydroxyl groups of the epoxide compound with hydroxyl and/or alkoxide groups present in the composition used to prepare the silicone rubber particles. In either embodiment the maximum diameter of the cured silicone rubber particles is 1 mm.

Chemical bonding of at least some of the epoxide compound to the silicone rubber is preferable because this improves the adhesive properties of the silicone rubber particles, particularly the durability of the adhesive bond formed between the particles and organics resins into which the particles are incorporated as additives.

The concentration of epoxide compound in the cured silicone rubber additives of this invention is typically in the range of from 0.1 to 15 weight percent, preferably from 0.5 to 10 weight percent. When the concentration of epoxide compound is less than about 0.1 weight percent, there is a decline in the ability of the particles to be miscible with and dispersible in organic resins and a tendency toward reduced adhesion with organic resins into which the cured particles of this invention are dispersed as modifiers.

When the concentration of exposide compound exceeds about 15 weight percent, the cured silicone rubber particles become sticky, and tend to provide less than desirable performance when used.

Any of the known cured silicone rubbers can be used as the silicone rubber portion of the present additive. Examples include (1) organoperoxide-cured silicone rubber prepared by heating a diorganopolysiloxane containing at least one vinyl radical in the presence of an organoperoxide; (2) addition-reaction-cured silicone rubber prepared from a composition comprising a diorganopolysiloxane containing silicon-bonded vinyl groups, a diorganopolysiloxane containing silicon-bonded hydrogen atoms and a platinum compound; (3) compositions cured in the presence of an organotin compound by a dehydrogenation/-condensation reaction between a diorganopolysiloxane having active hydrogen-containing functional group on both ends of the molecule and a diorganopolysiloxane having silicon-bonded hydrogen atoms; and (4) compositions cured by a condensation reaction between a diorganopolysiloxane having terminal hydroxyl groups and organosilane containing hydrolyzable groups in the presence of an organotin compound or a titanic acid ester.

Silicone rubber compositions that cure by an platinum-catalyzed addition reaction or one of the aforementioned condensation reactions are preferred due to ease of handling and manufacture of the silicone rubber particulate.

One of the requirements for the cured silicone rubber particles is that the maximum diameter of the particles be no larger than 1 mm, preferably 0.1 mm or less. If the particle diameter exceeds 1 mm, dispersibility of the particles in the organic resin is reduced, with a resulting loss of reinforcing effect on the physical properties of the resin.

There are no particular limitations on the form of the silicone rubber particulate, which varies depending on the type of organic resin into which the particles will be incorporated and the physical properties to be reinforced. Spherical particles are preferable from the standpoint of ease of addition and dispersibility.

The various methods for manufacturing the cured silicone rubber of the present invention will now be explained in detail.

In accordance with one method a liquid silicone rubber composition is prepared from an organopolysiloxane having at least two silicon-bonded hydroxyl groups in each molecule (ingredient A), an organohydrogenpolysiloxane having at least two silicon-bonded hydrogen atoms in each molecule (ingredient B), a curing catalyst (ingredient C), and an epoxy compound containing at least one unsaturated hydrocarbon group per molecule (ingredient D).

This liquid silicone rubber composition is then dispersed in water to prepare a dispersion or emulsion in which the composition is present as the discontinuous phase. The resultant dispersion or emulsion is then contacted with a gas or liquid maintained at a temperature above that of the water in the dispersion in order to completely cure the liquid silicone rubber composition.

There are no particular limitations on the location of the hydroxyl groups of ingredient A, but it is preferable that they be on both ends of the molecule.

The silicon-bonded organic groups present on ingredient A are unsubstituted or substituted monovalent hydrocarbon radicals. Examples of such radicals include but are not limited to alkyl radicals such as methyl, ethyl, propyl and butyl; alkenyl radicals such as vinyl and allyl; aryl radicals such as phenyl; aralkyl radicals such as benzyl; cycloalkyl radicals groups as cyclohexyl and cyclopentyl; and any of the foregoing hydrocarbon radicals wherein some or all of the hydrogen atoms are replaced with halogen atoms such as flourine, chlorine and bromine. Examples of these halogen substituted radicals include but are not limited to 3-chloropropyl and 3,3,3-trifluoropropyl. The silicon-bonded organic groups are generally methyl, vinyl, and phenyl radicals, but it is not necessary that they all be the same, since combinations of different organic groups are permissible.

The molecular structure of ingredient A is preferably straight-chain, which includes straight chains with a straight chains with slight branching. There are no particular limitations on the molecular weight of ingredient A, but a molecular weight of 3000 or above improves the physical characteristics of the finely divided cured silicone rubber and is therefore preferable.

Specific examples of ingredient A include but are not limited to methylphenylsiloxane/dimethylsiloxane copolymers and dimethylpolysiloxanes with terminal hydroxyl groups at both ends of the molecular chain, and methylvinylsiloxane copolymers with either dimethylsiloxane or methylvinylsilane units. These organopolysiloxanes can be synthesized using known methods such as for example ring-opening polymerization of cyclic organopolysiloxanes; hydrolysis of straight-chain or branching-chain organopolysiloxanes containing groups capable of hydrolysis, such as alkoxy groups and acyloxy groups; and hydrolysis of one type or two or more types of diorganopolysiloxanes.

Ingredient B is the crosslinking agent for ingredient A, and is an organohydrogenpolysiloxne containing at least 2 silicon-bonded hydrogen atoms per molecule. These hydrogen atoms can be located at the ends of the molecule, on non-terminal silicon atoms or at both positions. The silicon-bonded organic groups are selected from the same ones present on ingredient A described hereinabove, with the exception that aliphatically unsaturated hydrocarbon radicals such as vinyl are excluded.

The molecular structure of ingredient B is typically either straight-chain or cyclic, however branched chain and network type structures can also be used. These structures can be used singly or as mixtures of 2 or more types.

The organohydrogenpolysiloxanes suitable for use as ingredient B are selected from among those having a viscosity at 25° C. of from 0.001 1,000 Pa.s. If the viscosity is less than 0.001 Pa.s the volatility of this ingredient is increased and its content in the silicone rubber composition is unstable. If viscosity exceeds 1,000 Pa.s the industrial productivity is greatly reduced.

The silicon-bonded hydrogen content of ingredient B should constitute no more than 1 wt% of the this ingredient. The concentration of ingredient B in the curable silicone rubber composition is typically from 0.1 to 50 parts by weight per 100 parts by weight of ingredient A.

Ingredient C is a curing catalyst that promotes the condensation reaction between ingredients A and B. Examples of this catalyst include such organic acid metal salts as dibutyltin dilaurate, dibutyltin diacetate, stannous octoate, dibutyltin dioctoate, stannous laurate, iron (II) stannoctenate, lead laurate, and zinc octoate; titanium acid esters such as tetrabutyl titanate, tetrapropyl titanate, and dibutoxytitanium bis(ethylacetoacetate); amine compounds such as n-hexylamine, guanidine, and their chlorates; and platinum compounds such as chloroplatinic acid in an alcohol or ketone solution, complex compounds of chloroplatinic acid and diketones, platinum black, and platinum in a carrier substance.

The aforementioned organic acid metal salts, titanium acid esters, or amine compounds or their chlorates should be added in a range from 0.01 to 5 parts by weight and preferably from 0.05 to 2 parts by weight per 100 parts by weight of the ingredient A. The platinum-containing compounds are normally added in a range of from 0.1 to 1000 parts by weight, preferably from 1 to 100 parts by weight, of platinum metal per million parts by weight of the combined weight of ingredients A and B.

Ingredient D is the aforementioned epoxide compound containing at least one unsaturated hydrocarbon group per molecule or a condensation product of such a compound.

In accordance with another embodiment of this invention the silicone rubber powder of the present invention is prepared from a liquid silicone rubber composition comprising a diorganopolysiloxane having at least two silicon-bonded lower alkenyl groups in each molecule, referred to hereinafter as ingredient A1, an organohydrogenpolysiloxane having at least two silicon-bonded hydrogen atoms in each molecule, referred to hereinbefore as ingredient B, a platinum-containing curing catalyst, referred to hereinafter as ingredient C1, and at least one of the aforementioned epoxide compounds referred to hereinbefore as ingredient D.

Ingredient A1 must contain at least two silicon-bonded lower alkenyl groups in each molecule. When fewer that two alkenyl groups are present, a network structure will not be formed and a suitable cured product, that is, a silicone rubber, will not be generated. These lower alkenyl groups are exemplified by vinyl, allyl, and propenyl.

The lower alkenyl groups may be present at any site on the molecule, but are preferably present at least at the molecular terminals. The molecular structure of this component can be straight chain, branch-containing straight chain, cyclic, and network; straight chains, optionally slightly branched, are preferred.

The molecular weight of ingredient A1 is not critical. This ingredient can range from low viscosity liquids to very high viscosity gums. The viscosity is preferably at least 100 centipoise (0.1 Pa.s) at 25 degrees Centigrade in order to obtain a rubbery elastomeric cured product.

The organopolysiloxanes suitable for ingredient A1 are exemplified by methylvinylpolysiloxanes, methylvinylsiloxane-dimethylsiloxane copolymers, dimethylvinylsiloxy-terminated dimethylpolysiloxanes, dimethylvinylsiloxy-terminated dimethylsiloxane-methylphenylsiloxane copolymers, dimethylvinylsiloxy-terminated dimethylsiloxane-diphenylsiloxane-methylvinylsiloxane copolymers, trimethylsiloxy-terminated dimethylsiloxane-methylvinylsiloxane copolymers, trimethylsiloxy-terminated dimethylsiloxane-methylphenylsiloxane-methylvinylsiloxane copolymers, dimethylvinylsiloxy-terminated methyl (3,3,3-trifluoropropyl)polysiloxanes, dimethylvinylsiloxy-terminated dimethylsiloxane-methyl(3,3,3,-trifluoropropyl)siloxane copolymers, and polysiloxanes composed of $CH_2=CH(CH_3)_2SiO_{1/2}$ units, $(CH_3)_3SiO_{1/2}$ units, and $SiO_{4/2}$ units. Combinations of the above organopolysiloxanes can also be used in the present invention.

The organohydrogensiloxanes (ingredient B) suitable for use as curing agents for ingredient A1 have been discussed in a preceding section of this specification. Ingredient B is present in an amount equivalent to from 0.5 to 20 moles of silicon-bonded hydrogen atoms for each mole of lower alkenyl groups present in ingredient A1. It is difficult to produce good cured products at using less than 0.5 mole of silicon-bonded hydrogen per mole of lower alkenyl groups in A1, while the hardness of the cured product tends to increase with heating when the composition contains more than 20 moles of silicon-bonded hydrogen per mole of lower alkenyl groups in A1. When organosiloxanes containing substantial concentrations of lower alkenyl groups are added for purposes of reinforcement it is necessary to add additional ingredient B to compensate.

Ingredient C1 is a platinum-containing catalyst for the addition reaction between silicon-bonded hydrogen atoms and alkenyl groups, and is concretely exemplified by chloroplatinic acid. This compound can optionally be dissolved in an alcohol or ketone and the resulting solution optionally aged. Other suitable catalysts include the platinum-containing materials discussed hereinbefore in connection with ingredient C.

Ingredient C1 is present at a concentration of from 0.1 to 1,000 weight parts as platinum-type metal for each 1,000,000 weight parts of the total quantity of components (a) and (b). The crosslinking reaction will not proceed satisfactorily at below 0.1 weight parts, while exceeding 1,000 weight parts is uneconomical. A concentration of from 1 to 100 weight parts as platinum-type metal is preferred in the typical case.

Ingredient D, the epoxide compound, has been discussed in the preceding specification.

The liquid silicone rubber compositions of this invention can contain fillers to adjust the viscosity of the curable composition or the mechanical strength of the molded product. These filler are exemplified by reinforcing fillers such a precipitated silica, fumed, silica, calcined silica, and fumed titanium oxide, and by non-reinforcing fillers such as pulverized quartz, diatomaceous earth, asbestos, aluminosilicic acid, iron oxide, zinc oxide, and calcium carbonate. These fillers can be used directly without modification or their surfaces can be treated with organosilicon compounds such as hexamethyldisilazane, trimethylchlorosilane, or dimethylpolysiloxanes.

So long as the objectives of this invention are not adversely affected, the curable silicone rubber composition can contain small or very small quantities of an acetylenic compound, a hydrazine, a triazole, a phosphine, or a mercaptan as a platinum catalyst inhibitor.

Other additives such as pigments, heat stabilizers, flame retardants, plasticizers, and organopolysiloxanes containing 1 alkenyl group per molecule, the latter being for the propose of lowering the modulus of the cured silicone rubber composition.

In accordance with the present method for preparing the additive material of this invention, a curable liquid silicone rubber composition and the epoxide compound are dispersed into water.

Methods for dispersing the aforementioned liquid curable silicone rubber compositions in water include introducing either ingredients A, B, C and D or ingredients A1, B, C1, and D separately into water and dispersing them in the water; premixing either ingredients A, B and D or ingredients A1, B and D, dispersing these ingredients in water and subsequently adding ingredient C or C1 as appropriate; and premixing the ingredients of the curable liquid silicone rubber composition and dispersing this mixture in water. Any of these methods may be used for the present invention, but generally the latter two methods are preferable.

The aqueous dispersion or emulsion that is subsequently cured to yield the finely divided silicone rubber particles of this invention can be formed by a number of methods. In accordance with one such method, the ingredients of the curable liquid silicone rubber composition are premixed and added to water, and the mixture is passed through a commercially available colloid mill to form an aqueous dispersion or emulsion of the silicone rubber composition. An aqueous dispersion or emulsion can also be obtained by placing the liquid silicone rubber composition in a homogenizer, adding water, and stirring.

Surfactants can be used to improve the dispersion of the aforementioned silicone rubber composition. In this instance, the silicone rubber composition is added to a surfactant/water at a temperature of from 0° C. to 25° C. This mixture is then emulsified to form an emulsion of the silicone rubber composition.

A variety of methods can be used to form this emulsion. In accordance with one method, surfactant and water are added to the silicone rubber composition, and the mixture is passed through an emulsifying unit such as a homogenizing mixer, homogenizer, or colloid mill to form an emulsion. Alternatively, the ingredients of the curable composition are placed in a homogenizer together with the surfactant, mixing carried out, and then water added and additional mixing carried out to yield the emulsion.

The surfactant can be any non-ionic or anionic surfactant or emulsifier known in the art which is effective in the formation of an aqueous silicone emulsion, with no particular limitations other than avoiding substances containing functional groups or atoms which react with the silicon-bonded hydrogen atoms of ingredient B, or reduce the activity of this ingredient.

The temperature range within which the dispersion or emulsion is formed is preferable from 0° to 25° C. If the temperature falls below 0° C., the water may freeze, making it difficult to form the dispersion or emulsion. At temperatures above 25° C., the dispersion or emulsion is unstable, and there is a tendency for the resulting silicone rubber particles to be non-uniform in shape.

The dispersed or emulsified silicone rubber composition is then cured by heating it or contacting it with a gas or liquid maintained at a higher temperature than the curable composition until curing of the silicone rubber composition is completed.

If the curing temperature is lower than the temperature of the water of the initial dispersion, there will be a reduction in the curing rate and the objectives of this invention will not be realized. The temperature of the heated gas or liquid is preferably 50° C. or above, and most preferably at least 70° C.

There are no particular limitations on the liquid used. It is desirable to avoid liquids which will interfere with curing of the silicone rubber composition and liquids which will act as solvents for the silicone rubber composition.

Specific examples of suitable liquids for providing the heat need to cure the silicone rubber composition include water, liquid paraffin, waxes, and liquid compounds used in various thermal media such as dimethyl silicone oil and phthalic acid esters. Water is a preferred liquid because of its particularly large heat capacity and ease of use. When water is used, a preferred method comprises continuously and gradually feeding the water-based dispersion into a stirrer-equipped mixer filled with hot water.

There are no particular limitations on the gases used to cure the dispersed or emulsified silicone rubber composition, providing that they promote curing of the silicone rubber composition, however it is best to avoid flammable gases. Specific examples of suitable gasses include air, nitrogen gas, and various non-flammable liquid gasses.

There are a number of methods which involve bringing the aforementioned dispersion or emulsion into contact with a gas or liquid having a temperature higher than that of said dispersion to complete curing of the aforementioned silicone rubber composition. One method involves the hardening of said dispersion by leaving it in the heated liquid or gas, or spraying the dispersion into a high-temperature gas.

Another method for curing the silicone rubber composition involves supplying small quantities of the dispersed or emulsified composition to a mixer equipped with an agitator and filled with water heated to a specified temperature and providing continuous contact between the water and the dispersion or emulsion as agitation is continued. In a third method, a heated liquid is introduced into the dispersion or emulsion with continuous stirring. The quantity of heated liquid used here should preferably be at least twice the total volume of the dispersion or emulsion.

The finely divided silicone rubber particles of this invention can be used alone or as an additive for other materials. When used as an additive the silicone rubber particles can improve such physical properties as mechanical strength, water resistance, and lubricity in various materials.

Applications for which the cured silicone rubber particles can be used alone include but are not limited to solid lubricants, water-repellent agents, release agents, anti-tack agents, greases, oils, cements, plasters, paints, casting materials; molding materials, films, agricultural chemicals, and medical applications.

When the present cured silicone rubber particles are used as additives they can be blended together with polymers that include, for example, natural rubber, polychloroprene rubber, polybutadiene rubber, SBR, EPR, and EPT rubbers, polyisoprene rubber, polyisobutene rubber, polyacrylic acid ester rubber, polyurethane rubber, butadiene-acrylonitrile copolymer rubber, polyester rubber, polysulfide rubber, fluorinated rubber, silicone rubber, and copolymers and mixtures of these rubbers.

The particles can also be incorporated as additives into a variety of resins, including, for example, polyamides represented by the polyamides such as nylon-5, nylon-6, nylon-7, nylon-8, nylon-9, nylon-10, nylon-11, nylon-12, and nylon-6,6; saturated polyesters represented by such substances as polyethylene terephthalate, polybutylene terephthalate, polyhydrogenated xylylene terephthalate, polycaprolactone, and polypivalolactone; polycarbonates, acrylonitrile/styrene copolymers, polystyrene, polyethylene, polypropylene, polybutadiene, polyvinyl chloride, polyvinylidine chloride, polyacrylonitrile, polyvinyl alcohol, polyvinyl acetate, polyvinyl butyral, polymethyl methacrylate, flourine-containing resins, other polyolefin resins, polyethylene glycol, polyproplene glycol, polytetrahydrofuran, Penton(R), polyphenylene oxide, polyacetal and other polyethers, phenol resins, polyurethane resins, acrylic resins, urea resins, unsaturated polyesters, melamine resins, phthalic acid resins, polyimide resins, silicone resins, celluloid, acetyl cellulose, epoxy acrylates, polyacrylates, epoxy resins, and a variety of other thermoplastic and thermosetting resins, resins which can be hardened by means of ultraviolet, gamma-rays, electron beams, or other high-energy radiation, as well as block copolymers, random copolymers, and blends of these resins.

The resins may contain a variety of additives, including but not limited to powdered inorganic fillers, fibers such as glass or carbon fibers used as fiber fillers or as reinforcing materials, agents to increase heat stability, agents to improve weather resistance, other stabilizers, reinforcing agents, pigments and dyes.

The following examples describe preferred embodiments of the cured silicone rubber particles of this invention, methods for their production and the use of these particles as reinforcing additives for various polymers and resins. The examples should not be interpreted as limiting the scope of the present invention as defined in the accompanying claims. All parts in the examples are by weight and viscosity values are measured at 25° C.

Example 1

95 Parts hydroxyl-terminated dimethylpolysiloxane having a viscosity of 80 centipoise (0.08 Pa.s), 5 parts glycidyl methacrylate, and 20 parts of a dimethylhydrogensiloxy-terminated methylhydrogenpolysiloxane having a viscosity of 10 centistokes (0.01 Pa.s) and a silicon-bonded hydrogen content of 1.5 weight% were mixed to prepare a mixture (A).

95 Parts of the dimethylpolysiloxane described above and 5 parts glycidyl methacrylate were also mixed with 1.0 part dibutyltin dioctoate to prepare a mixture (B).

Mixtures (A) and (B) were placed in separate storage tanks, and these tanks were then cooled to −10° C. 500 Parts mixture (A) and 500 parts mixture (B) were then respectively fed to a static mixer manufactured by Tokushu Kika Kogyo K. K. and mixed to homogeneity. This mixture was then transferred to a colloid mill (model SA available from Manton-Gaulin. 20 parts surfactant a nonionic surfactant (an ethylene oxide adduct of trimethylnonanol available as Tergitol(R) TMN-6 from Union Carbine Corporation) and 6,000 parts ion-exchanged water were added at the same time. This was milled at 1,400 rpm on a 0.1 mm gap to yield a water-based dispersion of the liquid silicone rubber composition.

This water-based dispersion was maintained at room temperature for 3 hours, and was then sprayed at 3 L/hour using a sprayer into air at 300° C. in order to complete curing of the silicone rubber composition as the spray. The resultant silicone rubber powder was collected using a cyclone and bag filter. 1,900 g silicone rubber powder with an average particle diameter of 5 micrometers was recovered.

A thermosetting epoxy resin composition was prepared by mixing 10 parts of this silicone rubber powder with 100 parts liquid thermosetting epoxy resin (Chissonox 221 from Chisso K. K.), 75 parts acid anhydride (HN-5500 from Hitachi Kasei K. K.), and 1.0 part 1,8-diazabicyclo(5,4,0)-7-undecene. This epoxy resin composition was placed in an aluminum dish and cured at 175 degrees Centigrade for 30 minutes to prepare a molding.

When the cross-section of a fracture surface of this molding was inspected under the scanning electron microscope, it was observed that the silicone rubber powder was homogeneously dispersed in the epoxy resin layer and that its surface was completely in contact with and bonded with the epoxy resin layer.

For comparative purposes, a silicone rubber powder (average particle diameter=5 micrometers) was prepared as described in the first part of this example, but without the use of the glycidyl methacrylate. The dispersibility and bonding of this silicone rubber powder for epoxy resin were investigated using a scanning electron microscope. The silicone rubber powder was uniformly dispersed in the epoxy resin, however the surface of the particles had separated from the epoxy resin layer, and the presence of the resulting gaps prevented bonding.

Example 2

A mixture (A) was prepared by mixing 90 parts hydroxyl-terminated dimethylpolysiloxane having a viscosity of 80 centipoise and a hydroxyl group content=1.3 weight %, 10 parts glycidyl methacrylate, and 20 parts of the methylhydrogenpolysiloxane described in Example 1.

A mixture (B) was prepared by mixing 90 parts of the dimethypolysiloxane described above, 10 parts glycidyl methacrylate, and 1.0 part dibutyltin dioctoate.

These mixtures were mixed and dispersed in a colloid mill as in Example 1 to yield a water-based dispersion of the silicone rubber composition. This water-based dispersion was maintained at room temperature for 1 hour and was then sprayed at 3 L/hour using a sprayer into air at 250° C. degrees Centigrade in order to complete curing of the silicone rubber composition as the spray: a silicone rubber powder was produced. The cured powder product was collected using a cyclone and bag filter: 950 g silicone rubber powder with an average particle diameter of 6 micrometers was recovered.

The vinyl group-containing silicone rubber powder prepared as above was blended and then melt-mixed with polyethylene resin, followed by injection molding, and the affinity and bonding between the silicone powder and polyethylene resin in the obtained injection molding were investigated.

The composition was prepared by blending 100 Parts polyethylene resin (Hizex 1300J from Mitsui Petrochemical Industries Limited) in a Henschel mixer with 0.1 part dicumyl peroxide and 10 parts of the silicone rubber powder. The mixture was then pelleted in a pelletizer at 230° C. The pellets were dried in an over at 70° C. for 3 hours and then injection molded using a metal mold having a dumbbell-shaped cavity and the following conditions: melt temperature=220° C., mold temperature=60° C., injection time=10 seconds, solidification time=30 seconds.

When the fracture surface of the resultant solid resin product was inspected under the scanning electron microscope, it was found that the silicone powder blended into the resin was completely in contact with and bonded with the resin layer.

Example 3

10 Parts of the silicone rubber powder prepared as in Example 2 was kneaded on a two-scroll with 100 parts of a dimethylvinylsiloxy-terminated dimethylpolysiloxane gum and 0.3 parts 2,5-dimethyl-2,5-di(tert-butylperoxy)hexane to yield a homogeneous material. This was then press- vulcanized for 10 minutes at 170° C. to produce a 2 mm-thick sheet.

Examination of a fracture surface of the sheet using a scanning electron microscope revealed that the silicone rubber particles were completely in contact with and bonded to the layer of cured dimethylpolysiloxane gum.

Example 4

A mixture A, having a viscosity of 2000 centipoise (2 Pa.s) was prepared by mixing 100 parts dimethylvinylsiloxy-terminated dimethylpolysiloxane having a viscosity of 2 Pa.s and a vinyl content of 0.25 weight %, 3 parts trimethylsiloxy-terminated methylhydrogenpolysiloxane having a viscosity of 10 centipoise (0.1 Pa.s) and a silicon-bonded hydrogen content of 1 weight %, and 5 parts glycidyl methacrylate. A similar mixture B was prepared by mixing 100 parts of the dimethylpolysiloxane as described above with 0.3 parts isopropanolic chloroplatinic acid solution having a platinum content of 3 weight %. Mixtures A and B were separately placed in liquid silicone rubber composition tanks, and these tanks were then cooled to −30° C. 250 Parts mixture A and 250 parts mixture B were then fed to a homogenizer which had been cooled in advance to 5° C. and were mixed to homogeneity. The temperature of the mixture at this point was 5° C. 100 Parts of a nonionic surfactant (an ethylene oxide adduct of trimethylnonanol, available as Tergitol TMN-6 from Union Carbide Corporation) was then added, and, after mixing for 1 minute, 1,000 parts ion-exchanged water was added followed by emulsification for 5 minutes at 800 rpm. The temperature of the emulsion at this point was 10° C.

50 Parts of this emulsion was removed and placed in a stirrer-equipped flask, at which time 2,000 parts water at a temperature of 40° C. was introduced. The resultant mixture was stirred at 10 rpm to yield a cured silicone rubber powder. The cured silicone rubber powder product was then washed with water and dried. Inspection of this product under a microscope revealed an average particle diameter of 10 microns and a shape approximately that of a true sphere.

The dispersibility and adhesion of this silicone rubber powder in an epoxy resin matrix were evaluated as described in Example 1, and it was found that the silicone rubber powder was uniformly dispersed in the epoxy resin and its surface was in contact with and bonded to the epoxy resin layer.

That which is claimed is:

1. A finely divided additive material having a particular diameter of 1 mm or less and comprising a cured silicone rubber and from 0.1 to 15 percent, based on the weight of said material, of an epoxide compound containing at least one unsaturated hydrocarbon radical per molecule or a condensation product thereof, where said compound or condensation product thereof, is present in the unreacted form or is chemically bonded to said silicone rubber.

2. An additive material according to claim 1 where the concentration of said epoxide compound is from 0.5 to 5 percent, based on the weight of said material, the epoxide compound is glycidyl methacrylate, glycidyl acrylate, allyl glycidyl ether, or vinylcyclohexene monoxide, the cured silicone rubber is selected from the group consisting of organoperoxide-cured silicone rubber prepared by heating a diorganopolysiloxane containing at least one vinyl radical in the presence of an organoperoxide; silicone rubber prepared from a composition comprising a diorganopolysiloxane containing silicon-bonded vinyl groups, a diorganopolysiloxane containing silicon-bonded hydrogen atoms and a platinum compound; silicone rubber cured in the presence of an organotin compound or by a dehydrogenation/condensation reaction between a diorganopolysiloxane having active hydrogen-containing functional group on both ends of the molecule and a diorganopolysiloxane having silicon-bonded hydrogen atoms; and silicone rubber cured by a condensation reaction between a diorganopolysiloxane having terminal hydroxyl groups and organosilane containing hydrolyzable groups in the presence of an organotin compound or a titanic acid ester.

3. An additive material according to claim 2 where the particle diameter is up to 0.1 mm. and said material is spherical in shape, and said silicone rubber is prepared form a composition comprising
   (A) a diorganopolysiloxane having at least 2 silicon-bonded hydroxyl groups per molecule or a diorganopolysiloxane containing at least two alkenyl radicals per molecule.
   (B) an organohydrogenpolysiloxane having at least 2 silicon-bonded hydrogen atoms per molecule,
   (C) a curing catalyst, and
   (D) said epoxide compound,
where the molecular weight of (A) is at least 3000, the viscosity of (B) is from 0.001 to 1000 Pa.s, the concentration of (B) is from 0.1 to 50 parts by weight per 100 parts of (A) said curing catalyst is a platinum compound and is present at a concentration equivalent to from 0.1 to 1000 parts by weight of platinum per million parts of (A) and (B).

4. In an improved method for producing a finely divided cured silicone rubber additive material having a particle diameter of 1 mm or less, said method comprising the sequential steps of
   I. dispersing as the discontinuous phase in water a curable silicon rubber composition comprising
      (A) a diorganopolysiloxane having at least 2 silicon-bonded hydroxyl or 2 silicon-bonded alkenyl groups per molecule,
      (B) an organohydrogenpolysiloxane having at least 2 silicon-bonded hydrogen atoms per molecule, and
      (C) a curing catalyst in an amount sufficient to promote curing of said composition
   II. bringing the resultant dispersion or emulsion into contact with a gas or liquid having a temperature higher than said water to cure said composition in the form of said finely divided additive having a particle diameter of up to 1 mm., the improvement comprising the presence in said curable silicone rubber composition of (D) from 0.1 to 15 percent, based on the weight of said curable silicone rubber composition, of an epoxide compound containing at least one unsaturated hydrocarbon radical per molecule or a condensation product thereof, where said compound or condensation product thereof is present either in an unreacted form or is chemically bonded within said particle.

5. A method according to claim 4 where said particle diameter is up to 0.1 mm. and said material is spherical in shape, the epoxide compound is glycidyl methacrylate, glycidyl acrylate, allyl glycidyl ether, or vinylcyclohexene monoxide, the hydrocarbon groups present on said diorganopolysiloxane are selected from the group consisting of methyl, phenyl and 3,3,3,-trifluoropropyl, the molecular weight of (A) is at least 3000, the viscosity of (B) is from 0.001 to 1000 Pa.s, the concentration of (B) is from 0.1 to 50 parts by weight per 100 parts of (A) said curing catalyst is a platinum compound and is present at a concentration equivalent to from 0.1 to 1000 parts by weight of platinum per million parts of (A) and (B).

6. A method according to claim 5 where the hydrocarbon groups present on said oganopolysiloxane are methyl or a combination of methyl and vinyl.

* * * * *